(12) United States Patent
Song et al.

(10) Patent No.: US 8,554,084 B2
(45) Date of Patent: Oct. 8, 2013

(54) APPARATUS AND METHOD FOR VISIBLE LIGHT COMMUNICATION

(75) Inventors: Jae-Seung Song, Gyeonggi-do (KR); Tae-Han Bae, Gyeonggi-do (KR); Eun-Tae Won, Seoul (KR); Do-Young Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 343 days.

(21) Appl. No.: 12/857,107

(22) Filed: Aug. 16, 2010

(65) Prior Publication Data

US 2011/0038638 A1    Feb. 17, 2011

(30) Foreign Application Priority Data

Aug. 14, 2009  (KR) ................. 10-2009-0075445

(51) Int. Cl.
*H04B 10/00*   (2013.01)
(52) U.S. Cl.
USPC ............ 398/172; 398/140; 398/130; 398/118

(58) Field of Classification Search
USPC ......... 398/118, 119, 120, 123, 127, 128, 130, 398/172, 140
See application file for complete search history.

(56) References Cited

U.S. PATENT DOCUMENTS

| | | | |
|---|---|---|---|
| 6,965,739 B2 * | 11/2005 | Seto et al. | 398/183 |
| 7,570,246 B2 * | 8/2009 | Maniam et al. | 345/102 |
| 8,059,972 B2 * | 11/2011 | Yamada et al. | 398/208 |

* cited by examiner

*Primary Examiner* — M. R. Sedighian
(74) *Attorney, Agent, or Firm* — The Farrell Law Firm, P.C.

(57) ABSTRACT

An apparatus for transmitting Visible Light Communication (VLC) data, in which a data processor processes data to be transmitted, a modulator modulates data received from the data processor into a signal for VLC, a light output unit outputs light of a predetermined color and includes in the light a signal of any selected one characteristic among signals of two different characteristics, and a light output controller selects at least one of the signals of different characteristics, and controls the light output unit so that a signal from the modulator is output through the signal of the selected characteristic.

12 Claims, 6 Drawing Sheets

APPARATUS AND METHOD FOR VISIBLE LIGHT COMMUNICATION

PRIORITY

This application claims priority under 35 U.S.C. §119(a) to a Korean Patent Application filed in the Korean Intellectual Property Office on Aug. 14, 2009 and assigned Serial No. 10-2009-0075445, the entire disclosure of which is hereby incorporated by reference.

BACKGROUND OF THE INVENTION

1. Field of the Invention

The present invention relates generally to wireless communication, and more particularly, to an apparatus and method for performing wireless communication using visible light.

2. Description of the Related Art

Recently, there has been an increasing interest in optical wireless technology being complementary to Radio Frequency (RF) technology, due to the depletion of RF frequencies, the possible confusion (crosstalk) between various wireless communication technologies, the increasing demand for communication security, and the advent of the high-speed ubiquitous communication environment based on 4-th Generation (4G) wireless technology.

In particular, Visible Light Communication (VLC), which delivers information using visible rays or visible light, has many advantages, including allowing users to be aware of coverage of information because they can visually identify the place and direction where the light reaches and progresses, as well as being secure, having a broad band, and guaranteeing free use without restrictions. These advantages of VLC ensure reliable security and enable low-power driving. In addition, VLC is applicable even in hospitals and airplanes where the use of RF is restricted, and may also provide additional information services on electric sign boards such as a Light Emitting Diode (LED) display board. Therefore, studies of VLC are underway in many companies and research institutes.

A VLC system may be realized in various ways according to the apparatus to which VLC is applied. Typically, the VLC system may be realized to perform communication between an Access Point (AP) embodied by applying the VLC technology to any in-building lighting device, and a mobile terminal such as a cellular phone. Generally, VLC communication between an AP and a mobile terminal is performed in a cell formed by an AP applied to one lighting device, considering only physical mobility. However, in the case where only physical mobility is considered, a seamless communication service is possible while the mobile terminal is on the move within the cell, but if the mobile terminal leaves the cell, the seamless communication service may not be possible due to the interruption of communication.

Therefore, there is a demand for a method capable of performing VLC considering logical mobility, to allow a mobile terminal to maintain communication even while moving from one cell to another.

SUMMARY OF THE INVENTION

An aspect of the present invention is to address at least the above-mentioned problems and/or disadvantages and to provide at least the advantages described below. Accordingly, an aspect of the present invention is to provide a VLC apparatus and method for effectively realizing logical mobility.

In accordance with one aspect of the present invention, there is provided an apparatus for transmitting VLC data, the apparatus including a data processor for processing data to be transmitted; a modulator for modulating data received from the data processor into a signal for VLC; a light output unit for outputting light of a predetermined color, and including in the light a signal of any selected one characteristic among signals of two different characteristics; and a light output controller for selecting at least one of the signals of different characteristics, and controlling the light output unit so that a signal from the modulator is output through the signal of the selected characteristic.

In accordance with another aspect of the present invention, there is provided an apparatus for receiving VLC data, the apparatus including a light receiving unit for selectively receiving any one of signals of different characteristics; a light reception controller for controlling signal selection of the light receiving unit; a demodulator for demodulating a signal received from the light reception controller into VLC data; and a data processor for processing data from the demodulator.

In accordance with a further aspect of the present invention, there is provided a method for performing VLC by a mobile terminal, the method including discovering a communicable AP for VLC; sending a connection request for a communication link to the AP, and setting a communication link to the AP; setting a scheme to be used for logical mobility; and initiating communication with the AP, and exchanging data with the AP.

In accordance with yet another aspect of the present invention, there is provided a method for performing VLC with a mobile terminal by an AP for VLC, the method including, upon receipt of an AP discovery signal from the mobile terminal, responding to the AP discovery signal; upon receipt of a communication link connection request from the mobile terminal, setting a communication link to the mobile terminal; setting a scheme to be used for logical mobility of the mobile terminal; and initiating communication with the mobile terminal, and exchanging data with the mobile terminal.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS OF THE PRESENT INVENTION

Embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

A Visible Light Communication (VLC) apparatus according to an embodiment of the present invention includes a visible light transmitting apparatus and a visible light receiving apparatus. The visible light transmitting apparatus may be combined with a lighting device fixedly prepared inside or outside a building, and the visible light receiving apparatus may be combined with a mobile terminal or other portable device.

While one-way communication between a visible light transmitting apparatus combined with a lighting device prepared inside or outside a building and a visible light receiving apparatus combined with a mobile terminal is considered in an embodiment of the present invention, the present invention is not limited thereto. The lighting device and the mobile terminal may include the entire structures of the visible light transmitting apparatus and the visible light receiving apparatus, respectively. Alternatively, the lighting device may include partial structures of the visible light transmitting apparatus and the visible light receiving apparatus and the mobile terminal may also include partial structures of the visible light transmitting apparatus and the visible light receiving apparatus. Accordingly, two-way communication is also possible through the visible light transmitting apparatus and the visible light receiving apparatus provided in the lighting device and the mobile terminal.

Figure 1A:
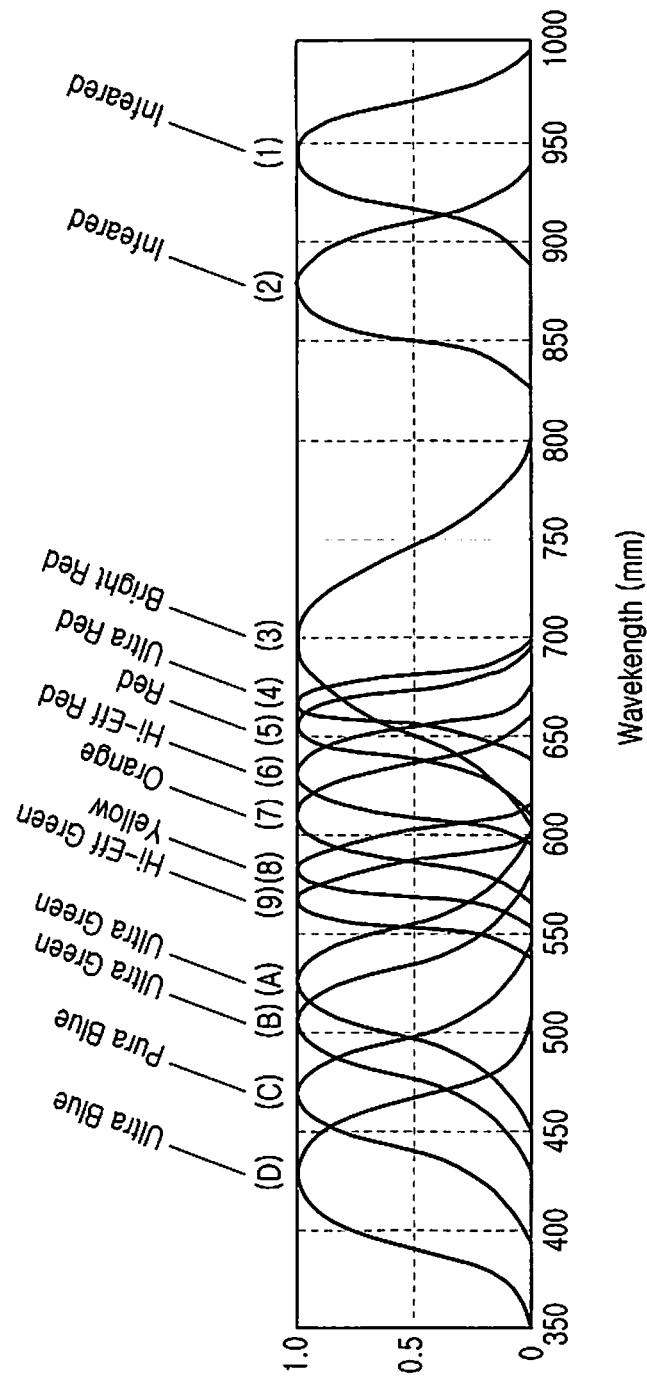
FIGS. 1A and 1B are diagrams showing wavelengths of visible light used for VLC.
Figure 1B:
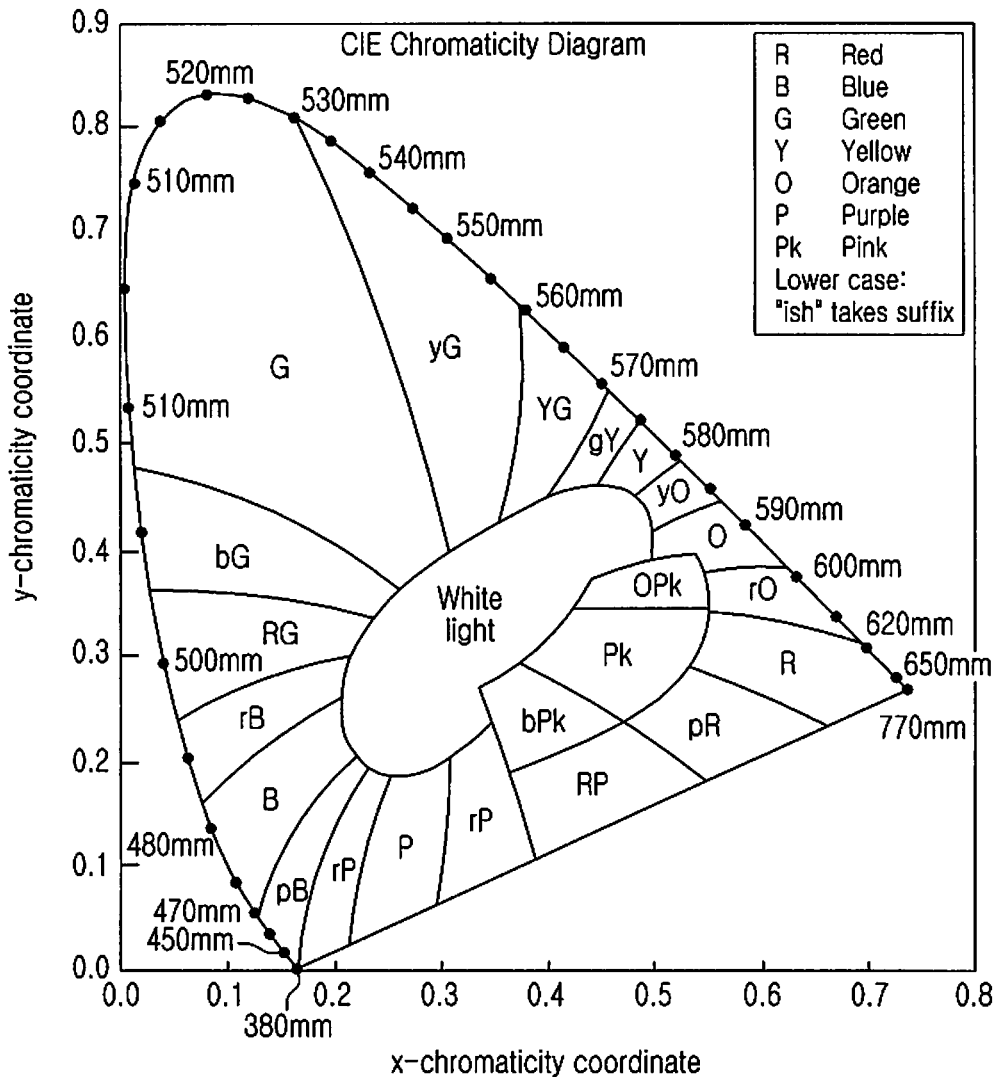

Based on the values measured by a spectrophotometer, every color can be expressed as a combination of a chromaticity (x,y) and a photometric quantity (Y) (the intensity of brightness of the color, or the amount of energy of light that arrives at a unit area perpendicular to a ray of the light, located a unit distance from a light source, within a unit time). Using this principle, in order to realize logical mobility in VLC, a method has been proposed in the prior art, in which each lighting device outputs visible light for lighting by combining different chromaticities (x,y) and photometric quantities (Y) in various ways, and realizes VLC through visible light having characteristics of different wavelengths by the combinations of chromaticities (x,y) and photometric quantities (Y). In particular, in order to avoid interference between cells, each lighting device is recommended to perform communication using visible light having a plurality of wavelengths as shown in FIGS. 1A and 1B. However, if a visible light transmitting apparatus uses a plurality of wavelengths to avoid interference between cells, a visible light receiving apparatus should be undesirably embodied to receive all wavelengths the visible light transmitting apparatus uses for VLC, since the visible light receiving apparatus does not know with which wavelength it should perform communication with the visible light transmitting apparatus.

To solve the problems caused in realizing logical mobility in VLC using a plurality of wavelengths, a VLC apparatus according an embodiment of the present invention provides an apparatus and method for effectively realizing logical mobility in VLC by minimizing the number of components provided in the VLC apparatus.

To be specific, a VLC apparatus according to an embodiment of the present invention uses visible light of at least 4 different characteristics, and a visible light transmitting apparatus used as a lighting device is provided such that visible light of 4 different characteristics are cross-output.

Figure 2:
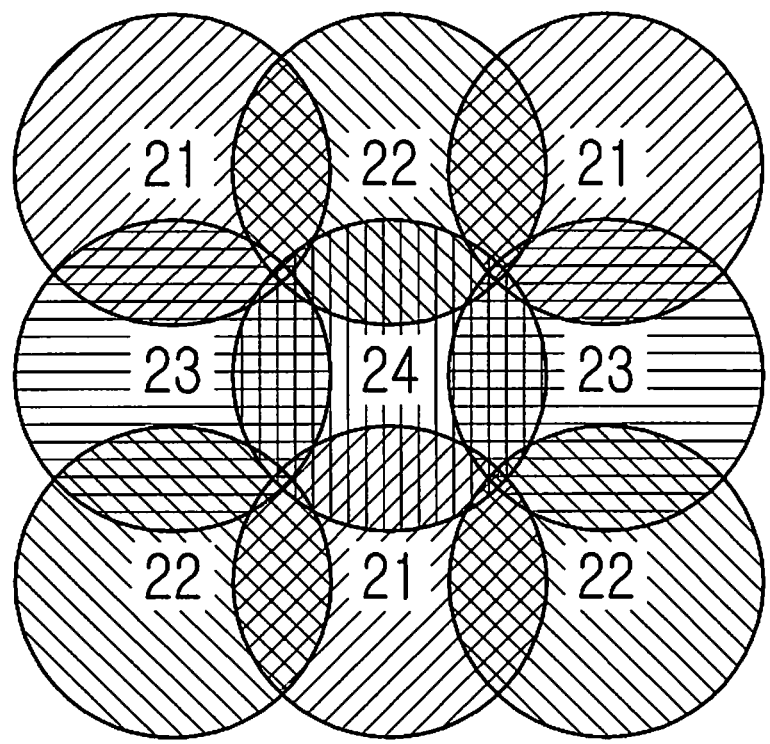
FIG. 2 is a diagram showing an array of visible light outputs in a visible light transmitting apparatus according to an embodiment of the present invention.

FIG. 2 shows an array of visible light outputs in a visible light transmitting apparatus according to an embodiment of the present invention.

Referring to FIG. 2, in a visible light transmitting apparatus according to an embodiment of the present invention, first areas 21 where a visible light signal of a first characteristic is output, second areas 22 where a visible light signal of a second characteristic is output, third areas 23 where a visible light signal of a third characteristic is output, and a fourth area 24 where a visible light signal of a fourth characteristic is output, are arrayed in sequence such that visible light of the same characteristics are not irradiated in the same areas in a duplicate manner.

While it is assumed that in an embodiment of the present invention, a VLC apparatus uses visible light of at least 4 different characteristics, the present invention is not limited thereto. The number of visible light of different characteristics used by a VLC apparatus may be changed in various ways by those of ordinary skill in the art, according to the method of designing areas covered by the visible light transmitting apparatus.

Figure 3:
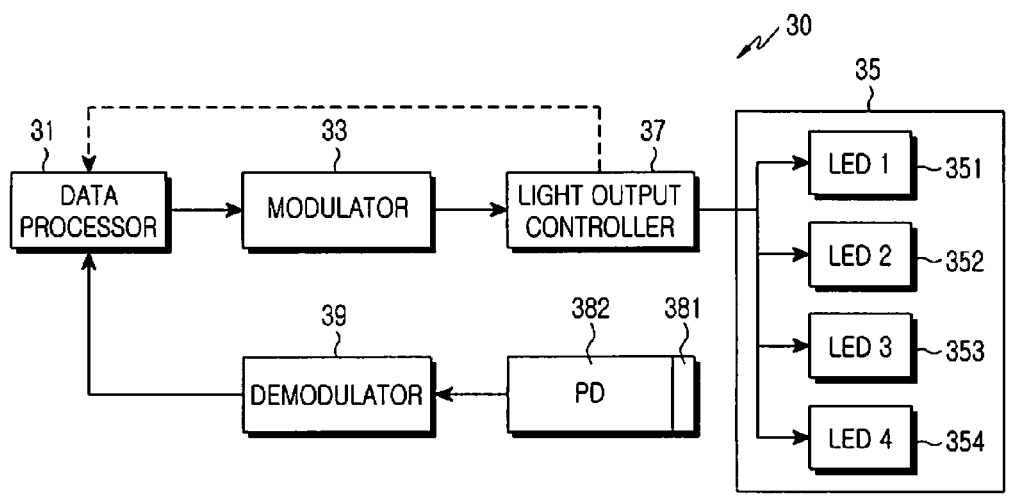
FIG. 3 is a block diagram showing a structure of a visible light transmitting apparatus according to an embodiment of the present invention.

FIG. 3 is a block diagram of a structure of a visible light transmitting apparatus according to an embodiment of the present invention.

Referring to FIG. 3, a visible light transmitting apparatus 30 according to an embodiment of the present invention includes a data processor 31 for generating data to be transmitted by VLC, based on a VLC protocol, a modulator 33 for modulating the data based on the VLC protocol, and a light output unit 35 for outputting visible light for lighting, and transmitting the modulated data through a visible light signal.

In order for the visible light transmitting apparatus 30 to output visible light of at least 4 different characteristics as described above, the light output unit 35 includes a plurality of optoelectronic devices, such as first, second, third and fourth LEDs 351, 352, 353 and 354 for outputting visible lights of at least 4 different colors. The light output unit 35 outputs light (for example, white light) used in a lighting device, and at least first, second and third LEDs 351, 352 and 353 may output red, green and blue lights, respectively. The fourth LED 354 may output light (for example, yellow light) that is set to output the light (for example, white light) used in the lighting device, together with the first, second and third LEDs 351, 352 and 353.

The visible light transmitting apparatus 30 further includes a light output controller 37 for controlling output signal characteristics of the light output unit 35. The light output controller 37 selects an output signal characteristic of the light output unit 35, and controls the light output unit 35 so that a signal from the modulator 33 is output through a signal of the selected characteristic. To be specific, the light output controller 37 selects any one of the first, second, third and fourth LEDs 351, 352, 353 and 354 in the light output unit 35, and connects or switches a transmission path of a signal from the modulator 33 to the selected LED.

Preferably, the light output controller 37 provides information indicating the selected output signal characteristic to the data processor 31, and the data processor 31 includes the information indicating the selected output signal characteristic, in the data to be transmitted.

To perform two-way communication, the visible light transmitting apparatus 30 includes an optical filter 381 and a photodetector (PD) 382, or a light receiving device, for receiving a signal transmitted from a visible light receiving apparatus, and may further include a demodulator 39 for demodulating the received signal based on the VLC protocol and outputting the demodulated signal to the data processor 31.

Figure 4:
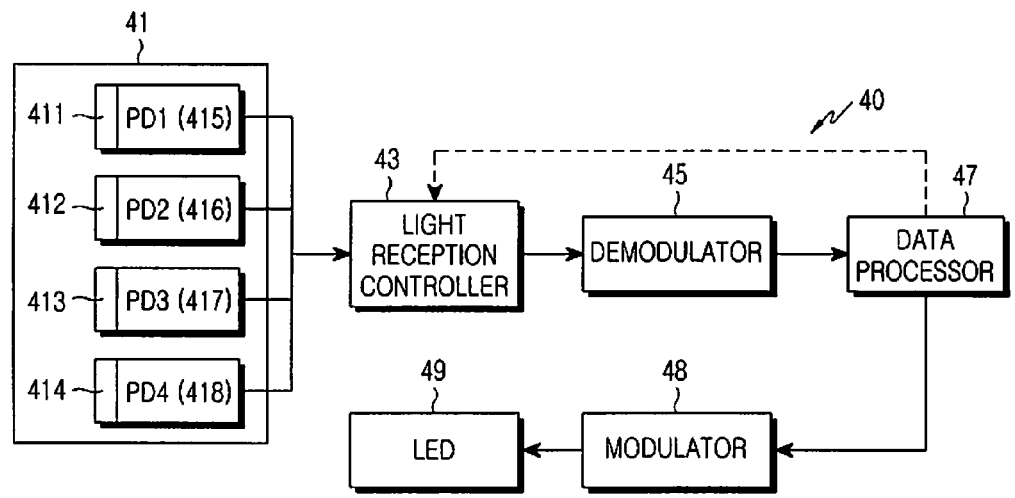
FIG. 4 is a block diagram showing a structure of a visible light receiving apparatus according to an embodiment of the present invention.

FIG. 4 is a block diagram of a structure of a visible light receiving apparatus according to an embodiment of the present invention.

Referring to FIG. 4, a visible light receiving apparatus 40 according to an embodiment of the present invention includes a demodulator 45 for demodulating a received signal based on a VLC protocol, and a data processor 47 for processing data from the demodulator 45 based on the VLC protocol.

In addition, the visible light receiving apparatus 40, which corresponds to the visible light transmitting apparatus outputting visible light of different characteristics, includes a light receiving unit 41 and a light reception controller 43, as components for selectively receiving any one of visible light signals of different characteristics.

As the visible light transmitting apparatus outputs visible light of at least 4 different characteristics, or different colors, the light receiving unit 41 includes optical filters passing light of the different colors. To be specific, as the visible light transmitting apparatus outputs visible light signals using LEDs outputting red, green and blue lights, respectively, the light receiving unit 41 includes first, second and third optical filters 411, 412 and 413 passing red, green and blue visible light, respectively. In addition, as the visible light transmitting apparatus additionally outputs light (for example, yellow light) that is set to output the light (for example, white light) used in the lighting device, together with the red, green and blue visible light, the visible light receiving apparatus 40 further includes a fourth optical filter 414 passing the corresponding visible light.

The light receiving unit 41 includes a plurality of photodetectors PD1 415, PD2 416, PD3 417 and PD4 418 for converting light signals having passed through the first, second, third and fourth optical filters 411, 412, 413 and 414, respectively, into electrical signals.

The visible light receiving apparatus 40 further includes the light reception controller 43 for controlling a signal reception path of the light receiving unit 41. To be specific, the light reception controller 43 selects any one of the first, second, third and fourth optical filters 411, 412, 413 and 414 in the light receiving unit 41, and controls the light receiving unit 41 so that a visible light signal output from the selected optical filter is delivered to the demodulator 45 through a photodetector corresponding to the selected optical filter.

Preferably, the data processor 47 detects, from received data, information indicating the selected output signal characteristic inserted by the visible light transmitting apparatus, and provides the detected information to the light reception controller 43. Accordingly, the light reception controller 43 may select an optical filter and a photodetector corresponding to the selected output signal characteristic.

To perform two-way communication, the visible light receiving apparatus 40 may further include a modulator 48 for modulating data for carrying a visible light signal to the visible light transmitting apparatus, and an LED 49 for outputting the modulated data in a visible light signal of a predetermined color.

Figure 5:
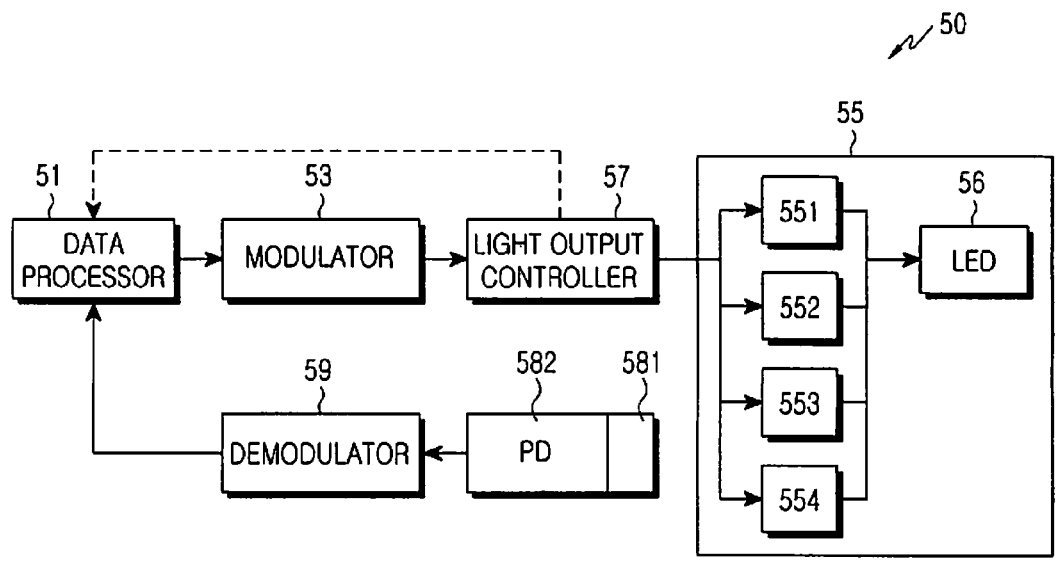
FIG. 5 is a block diagram showing a structure of a visible light transmitting apparatus according to another embodiment of the present invention.

FIG. 5 is a block diagram of a structure of a visible light transmitting apparatus according to another embodiment of the present invention.

Referring to FIG. 5, a visible light transmitting apparatus 50 according to another embodiment of the present invention includes a data processor 51 and a modulator 53, which are the same as the data processor 31 and the modulator 33 provided in the visible light transmitting apparatus 30.

The visible light transmitting apparatus 50 includes a light output unit 55 for outputting visible light for lighting, and transmitting the modulated data through a visible light signal.

In order for the visible light transmitting apparatus 50 to output visible light of at least 4 different characteristics as described above, the light output unit 55 includes first, second, third and fourth frequency converters 551, 552, 553 and 554 for converting an input signal into signals having at least 4 different frequencies. The light output unit 55 further includes an LED 56 for outputting light (for example, white light) used in the lighting device, and the LED 56 converts signals output from the first, second, third and fourth frequency converters 551, 552, 553 and 554 into a visible light signal for VLC, and outputs the visible light signal together with the light used in the lighting device.

The visible light transmitting apparatus 50 further includes a light output controller 57 for controlling output signal characteristics of the light output unit 55. The light output controller 57 selects an output signal characteristic, or an output frequency, of the light output unit 55, and controls the light output unit 55 so that a signal from the modulator 53 is output through a signal of the selected frequency. To be specific, the light output controller 57 selects any one of the first, 5 second, third and fourth frequency converters 551, 552, 553 and 554 in the light output unit 55, and connects or switches a transmission path of a signal from the modulator 53 to the selected frequency converter.

Preferably, the light output controller 57 provides information indicating the selected output signal characteristic to the data processor 51, and the data processor 51 includes the information indicating the selected output signal characteristic, in the data to be transmitted.

The visible light transmitting apparatus 50, like the visible light transmitting apparatus 30, may further include an optical filter 581, a photodetector 582 and a demodulator 59, for performing two-way communication.

Figure 6:
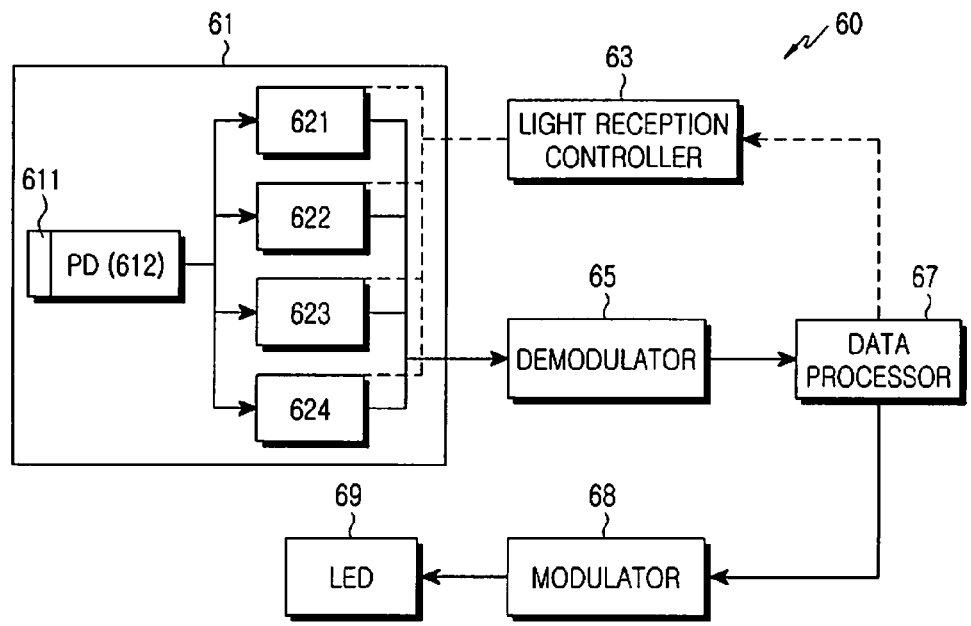
FIG. 6 is a block diagram showing a structure of a visible light receiving apparatus according to another embodiment of the present invention.

FIG. 6 is a block diagram of a structure of a visible light receiving apparatus according to another embodiment of the present invention.

Referring to FIG. 6, a visible light receiving apparatus 60 according to another embodiment of the present invention includes a demodulator 65 and a data processor 67, which are the same as the demodulator 45 and the data processor 47 provided in the visible light receiving apparatus 40.

The visible light receiving apparatus 60, like the visible light receiving apparatus 40, includes a light receiving unit 61 and a light reception controller 63, for selectively receiving any one of the visible light signals of different characteristics. However, unlike the visible light receiving apparatus 40 receiving visible light signals of different colors, the visible light receiving apparatus 60 receives any one of visible light signals having different frequencies. Accordingly, the light receiving unit 61 includes an optical filter 611 for passing visible light of a predetermined color (for example, white color), and a photodetector 612 for converting the light signal having passed through the optical filter 611 into an electrical signal. In addition, the light receiving unit 61 includes bandpass filters passing signals having frequencies in different bands. To be specific, as the visible light transmitting apparatus 50 outputs visible light signals of different frequencies, the light receiving unit 61 includes first, second, third and fourth bandpass filters 621, 622, 623 and 624 that pass frequencies corresponding to the output frequencies of the visible light transmitting apparatus 50, respectively.

Specifically, the light reception controller 63 selects any one of the first, second, third and fourth bandpass filters 621, 622, 623 and 624 in the light receiving unit 61, and controls the light receiving unit 61 so that a signal output from the selected bandpass filter is delivered to the demodulator 65.

Preferably, the data processor 67 detects, from received data, information indicating the selected output signal characteristic inserted by the visible light transmitting apparatus, and provides the detected information to the light reception controller 63. Accordingly, the light reception controller 63 may select a bandpass filter corresponding to the selected output signal characteristic.

The visible light receiving apparatus 60, like the visible light receiving apparatus 40, may further include a modulator 68 and an LED 69, for performing two-way communication.

Figure 7:
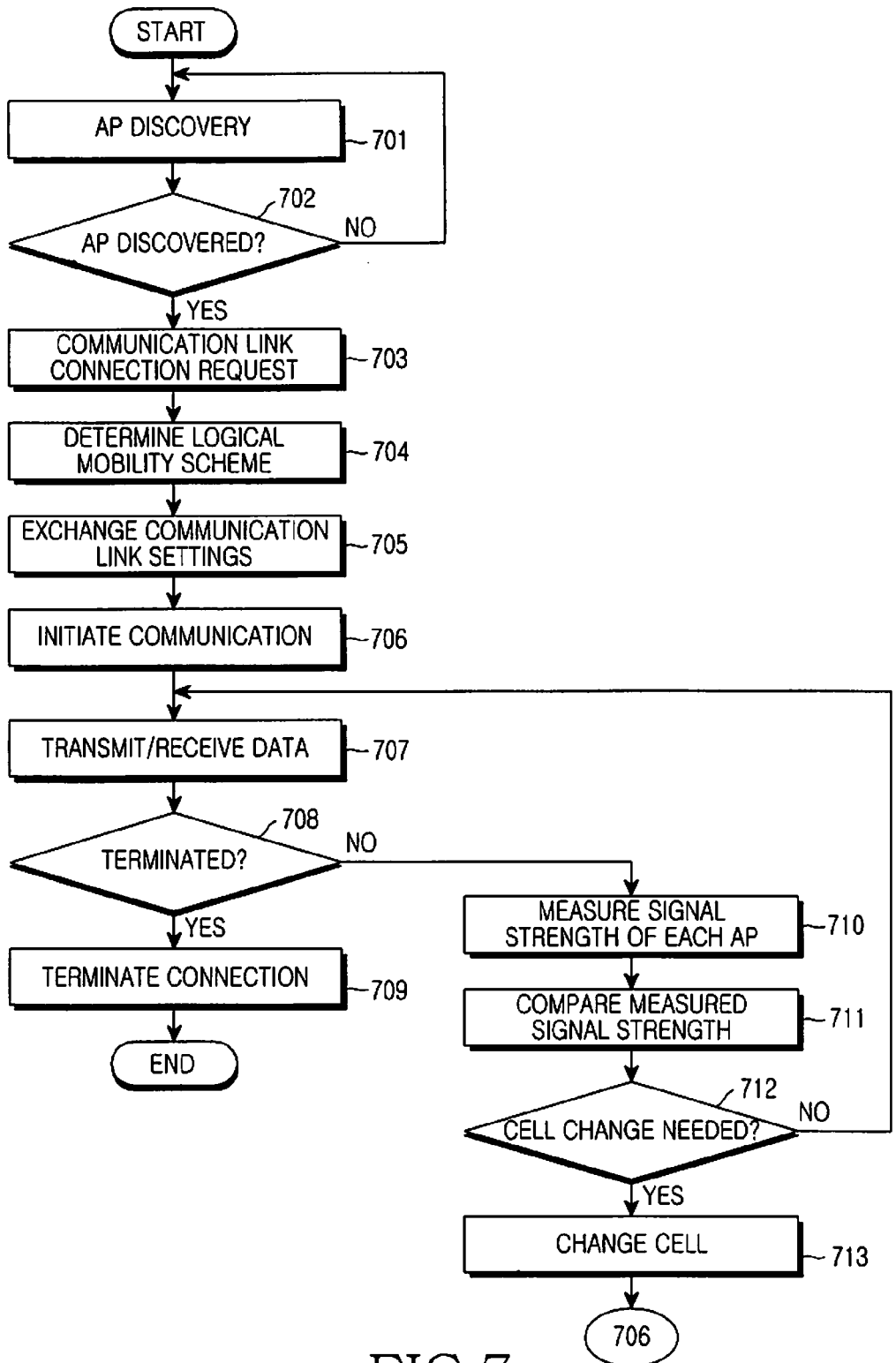
FIG. 7 is a flowchart showing a process of a VLC method according to an embodiment of the present invention.

FIG. 7 is a flowchart of a VLC method according to an embodiment of the present invention.

It is assumed that in the process of a VLC method, the visible light transmitting apparatus according to the present invention may serve as an Access Point (AP) and the visible light receiving apparatus according to the present invention may serve as a mobile terminal.

Referring to FIG. 7, in a VLC method according to an embodiment of the present invention, a mobile terminal first performs an AP discovery process in step 701. If the mobile terminal supporting VLC enters the area, or cell, where a lighting device for VLC is installed, the mobile terminal determines in step 702 whether an AP is discovered, from which it can receive a signal. Upon discovering a communicable AP in step 702, the mobile terminal proceeds to step 703, and upon failure to discover a communicable AP in step 702, the mobile terminal returns to step 701.

In step 703, the mobile terminal sends a request for communication link connection to the AP. In step 704, the AP and the mobile terminal set a scheme to be used for logical mobility. To be specific, the AP and the mobile terminal exchange their supportable scheme (for example, wavelength or frequency of visible light colors) for logical mobility, and then determine a scheme to be used for logical mobility.

In step 705, the AP and the mobile terminal exchange communication link setting information for communication connection. Specifically, the AP provides the mobile terminal with information indicating an array of cells formed by a serving AP accessed by the mobile terminal and by APs adjacent to the serving AP. The mobile terminal uses the provided information in supporting its logical mobility.

In step 706, communication between the AP and the mobile terminal is initiated. In step 707, the AP and the mobile terminal exchange data.

It is determined in step 708 whether the data exchange between the AP and the mobile terminal has been terminated. If so, the connection between the AP and the mobile terminal is terminated in step 709, and if not, the mobile terminal measures strengths of signals received from adjacent APs to consider a cell change, or logical mobility, in step 710. For example, in signal strength measurement, the mobile terminal measures power of light of a wavelength used by each AP, or power of a signal received through each bandpass filter.

In step 711, the mobile terminal compares the measured strengths of signals from the APs. In step 712, the mobile terminal analyzes the comparison results of the signal strengths and determines whether logical mobility is needed because the mobile terminal is on the move and enters a cell formed by another AP. If there is no need for cell change, the mobile terminal returns to step 707 and exchanges data with the AP, and if there is a need for cell change, the mobile terminal checks the cell array information received in step 705, in step 713, and returns to step 706 to request communication connection for connection with another cell.

Although it is assumed that in an embodiment of the present invention, the AP discovery of step 701 and the communication link connection request of step 703 are performed by the mobile terminal, the present invention is not limited thereto. As an alternative, the AP discovery and the communication link connection request may be performed by the AP. For example, in step 701, the AP determines whether a mobile terminal capable of VLC exists in a cell covered by the AP, and upon discovering the mobile terminal, the AP may send a request for communication link connection to the mobile terminal in step 703.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. An apparatus for transmitting Visible Light Communication (VLC) data, comprising:
    a data processor for processing data to be transmitted;
    a modulator for modulating data received from the data processor into a signal for VLC;
    a light output unit for outputting light of a predetermined color, and including in the light a signal of any selected one characteristic among signals of two different characteristics; and
    a light output controller for selecting at least one of the signals of the different characteristics, and controlling the light output unit so that a signal from the modulator is output through the signal of the selected characteristic,
    wherein the data processor includes, in the data to be transmitted, information indicating a characteristic selected by the light output controller.

2. The apparatus of claim 1, wherein the light output unit includes a plurality of optoelectronic devices outputting lights of different colors, and outputs light used for lighting by combining lights of different colors generated from the plurality of optoelectronic devices.

3. The apparatus of claim 2, wherein the light output unit includes at least four Light Emitting Diodes (LEDs) generating different colors.

4. The apparatus of claim 2, wherein the light output controller selects any one optoelectronic device from among the plurality of optoelectronic devices, and delivers a signal from the modulator to the selected optoelectronic device.

5. The apparatus of claim 1, wherein the light output unit comprises:
    a plurality of frequency converters for converting an input signal into signals having different frequencies; and
    an optoelectronic device for converting a signal from each of the frequency converters into a light signal.

6. The apparatus of claim 5, wherein the light output controller selects any one of the plurality of frequency converters, and delivers a signal from the modulator to the selected frequency converter.

7. An apparatus for receiving Visible Light Communication (VLC) data, comprising:
- a light receiving unit for selectively receiving any one of signals of different characteristics;
- a light reception controller for controlling signal selection of the light receiving unit;
- a demodulator for demodulating a signal received from the light reception controller into VLC data; and
- a data processor for processing data from the demodulator, wherein the data processor detects, from received data, information indicating a characteristic selected by the light reception controller, and provides the detected information to the light reception controller.

8. The apparatus of claim 7, wherein the light receiving unit comprises:
- a plurality of optical filters for passing lights of different colors, respectively; and
- a plurality of photodetectors for detecting light signals passing through the plurality of optical filters, respectively, and converting the detected light signals into electrical signals.

9. The apparatus of claim 8, wherein the light reception controller selects any one of the plurality of photodetectors, and delivers a signal output from the selected photodetector to the demodulator.

10. The apparatus of claim 7, wherein the light receiving unit comprises:
- an optical filter for passing light of a predetermined color;
- a photodetector for detecting a light signal passing through the optical filter, and converting the detected light signal into an electrical signal; and
- a bandpass filter for passing a signal of a frequency band selected by the light reception controller.

11. The apparatus of claim 10, wherein the bandpass filter comprises a plurality of bandpass filters for passing signals of different bands, respectively, and passes a signal from the photodetector through the bandpass filter selected by the light reception controller.

12. A Visible Light Communication (VLC) system, the system comprising:
- an apparatus for transmitting VLC data including a data processor for processing data to be transmitted, a modulator for modulating data received from the data processor into a signal for VLC, a light output unit for outputting light of a predetermined color, and including in the light a signal of any selected one characteristic among signals of two different characteristics, and a light output controller for selecting at least one of the signals of the two different characteristics, and controlling the light output unit so that a signal from the modulator is output through the signal of the selected characteristic, wherein the data processor includes, in the data to be transmitted, information indicating a characteristic selected by the light output controller; and
- an apparatus for receiving VLC data including a light receiving unit for selectively receiving the any one of signals of two different characteristics, a light reception controller for controlling signal selection of the light receiving unit, a demodulator for demodulating a signal received from the light reception controller into VLC data, and a data processor for processing the VLC data from the demodulator, wherein the data processor detects, from received data, information indicating a characteristic selected by the light reception controller, and provides the detected information to the light reception controller.

* * * * *